United States Patent [19]

Pecore

[11] Patent Number: 5,508,878
[45] Date of Patent: Apr. 16, 1996

[54] ELECTRONIC TIMER USING ZERO POWER WHILE OFF

[75] Inventor: Rick A. Pecore, Manitowoc, Wis.

[73] Assignee: Paragon Electric Company, Inc., Two Rivers, Wis.

[21] Appl. No.: 204,482

[22] Filed: Mar. 2, 1994

[51] Int. Cl.⁶ .......................... H01H 47/18; H01H 47/32
[52] U.S. Cl. .......................... 361/195; 361/170; 307/140; 307/141.8
[58] Field of Search .......................... 361/170, 195–202, 361/166–169.1, 194, 189–191; 307/112, 113, 114, 139, 140, 141, 141.4, 141.8

[56] References Cited

U.S. PATENT DOCUMENTS

| | | | |
|---|---|---|---|
| 3,099,758 | 7/1963 | Pieczynski | 307/141.8 |
| 4,339,696 | 7/1982 | Jabor | 307/141 X |
| 4,540,984 | 9/1985 | Waldman | 340/825 |
| 4,712,019 | 12/1987 | Nilssen | 307/141 |
| 4,775,801 | 10/1988 | Baum | 307/141 |
| 4,797,568 | 1/1989 | Gumbs | 307/141 |
| 5,172,045 | 12/1992 | Takeyasu | 320/37 |
| 5,191,231 | 3/1993 | Berry | 307/142 |

Primary Examiner—Fritz M. Fleming
Attorney, Agent, or Firm—Foley & Lardner

[57] ABSTRACT

An apparatus interrupts a circuit at a predetermined time. The circuit includes a load and a source of time-varying current. The apparatus includes a relay circuit including a latching relay switch, a first relay coil and a second relay coil, the relay switch switching to engage a first current path when energy is applied to the first relay coil, the relay switch switching to engage a second current path when energy is applied to the second relay coil. The apparatus further includes a switch coupled with the relay means for selectively completing the circuit through one current path of the first current path and the second current path. The apparatus further includes a power supply responsive to the time-varying current for generating a reference voltage, and a timer for measuring a time factor in response to the reference voltage. The apparatus further includes a control circuit coupled with the power supply and the relay circuit and receiving a timeout signal from the timer, the control circuit responding to the timeout signal by applying energy to one relay coil of the first relay coil and the second relay coil, the relay switch switching when the energy is applied to the one relay coil to establish the other current path and to interrupt the circuit.

25 Claims, 3 Drawing Sheets

ELECTRONIC TIMER USING ZERO POWER WHILE OFF

BACKGROUND OF THE INVENTION

The present invention is generally directed to an apparatus for interrupting a circuit at a predetermined time. The present invention is more particularly directed to an in-line electronic timer which provides improved safety and energy conservation by interrupting a circuit after a predetermined time and by drawing no current and dissipating no power after interrupting the circuit.

Electronic timer circuits have often been used for interrupting a circuit formed between a source of alternating current (an AC source) and a load. Such timer circuits generally include a timer, a control circuit and a switch. When the switch is actuated, the circuit is completed between the AC source and the load, allowing current to flow to the load. The timer is powered by the AC source and begins timing when the circuit is completed. When the timer has measured a predetermined time, the timer generates a timeout indication. In response to the timeout indication, the timer circuit interrupts the circuit, decoupling the load from the AC source.

One particular use for such a timer is in conjunction with a wall switch which controls room lighting. Actuation of the wall switch provides alternating current to the lighting and starts the timer. When the timer times out, the circuit is interrupted, turning off the lights. Such electronic timers are important for conserving energy by automatically disconnecting the load, such as lighting, from the AC source.

However, the energy-conserving capability of such prior art in-line timer circuits has been limited due to the power consumed by the timer circuit itself. Even when the circuit is interrupted and little or no current flows from the AC source to the load, prior art timer circuits consume power. Some prior art timer circuits employ a relay to interrupt the circuit. When the timer times out, the timer energizes a relay coil to actuate a relay switch and interrupt the circuit. Even after the timer times out, however, the timer circuit consumes power in the form of the holding current which continuously energizes the relay coil to hold the relay switch open.

Another prior art timer uses a triac, a bidirectional thyristor, which converts from a high impedance "blocking" state to a low impedance "on" state in response to an applied control current. When the timer times out, the control circuit removes the control current and the triac changes to its blocking state, interrupting the circuit. Such a timer uses two power supplies, one which is operating when the triac is conducting and one which is operating when the triac is blocking. Thus, the timer still draws current from the AC source, even when the circuit to the load is interrupted.

Such prior art in-line timer circuits which draw current even when the circuit to the load is interrupted also pose a safety hazard.

Such timer circuits may allow a small current to flow in the circuit after the timer times out. This small current may be insufficient to activate the load, for example, to cause a lighting system to provide illumination. However, such timer circuits may be used in conjunction with AC sources which generate potential differences as high as hundreds of volts. At such high voltages, even a very small current passing through the timer circuit to the load may be dangerous to a person working with equipment that forms the load. Such a person may assume the timer circuit has decoupled the load from the AC source since the load is not apparently active. Such a person may be injured by the small currents conducted by the timer circuit which are insufficient to activate the load.

The present invention overcomes these limitations and provides other advantages over the prior art. The present invention provides an electronic timer which automatically switches an electrical load off after a programmed time. The present invention consumes no power after interrupting the circuit and blocks all current flowing to the load. The present invention may be adapted to operate in conjunction with both standard (i.e., two-way) and three-way switching circuits.

SUMMARY OF THE INVENTION

The present invention provides an apparatus for interrupting a circuit at a predetermined time, the circuit including a load and a source of time-varying current. The apparatus includes relay means including a latching relay switch, a first relay coil and a second relay coil, the relay switch switching to engage a first current path when energy is applied to the first relay coil, the relay switch switching to engage a second current path when energy is applied to the second relay coil. The apparatus further includes switch means coupled with the relay means for selectively completing the circuit through one current path of the first current path and the second current path, the circuit conducting the time-varying current when the switch means completes the circuit. The apparatus still further provides power supply means responsive to the time-varying current for generating a reference voltage and timer means coupled with the power supply means for measuring a time factor in response to the reference voltage, the timer means having an output for providing a timeout signal when the timer measures the time factor. The apparatus still further provides control means coupled with the power supply means and the relay means and having an input coupled with the timer means output for receiving the timeout signal. The control means responds to the timeout signal by applying energy to one relay coil of the first relay coil and the second relay coil, the relay switch switching when the energy is applied to the one relay coil to engage the other current path of the first current path and the second current path to interrupt the circuit.

The invention further provides an apparatus for inclusion in a circuit for interrupting the circuit at a predetermined time, the circuit including a load and a source of time-varying current. The apparatus includes a first current path segment and a second current path segment. The apparatus further includes a first switching means for selectively electrically connecting a first switch pole with one current path segment of the first current path segment and the second current path segment. The one current path segment being an active current path segment; the other current path segment of the first current path segment and the second current path segment being an inactive current path segment. The selectively electrically connecting is effected with the first current path segment in response to a first control signal and with the second current path segment in response to a second control signal. The apparatus further includes a second switching means configured for selectively electrically engaging one of the first current path segment and the second current path segment with a second switch pole, the first switch pole and the second switch pole being coupled within the circuit to complete the circuit when the second switching means electrically engages the active current path segment. The invention further provides power supply means coupled with the source of time-varying current and responsive to the time-varying current for generating a reference signal, and timer means coupled with the power supply means and responsive to the reference signal for determining the predetermined time. The timer means generates a timeout signal at a timer output to indicate determination of the predetermined time. The invention still further provides control means coupled with the timer output and with the first switching means for generating a timeout control signal in response to the timeout signal, the timeout control signal being one control signal of the first control signal and the second control signal. The first switching means electrically connects the inactive current path segment with the first switch pole in response to the timeout control signal to interrupt the circuit.

It is, therefore, an object of the present invention to provide an apparatus for interrupting a circuit including an AC source and a load upon measuring a predetermined time. The predetermined time may be either a time duration or a time setpoint.

It is a further object of the present invention to provide an apparatus which interrupts a circuit and which draws no current upon interrupting the circuit, dissipating zero power when the circuit is interrupted.

It is a further object of the present invention to provide an apparatus which completely decouples the load from the AC source when the circuit is interrupted, providing no current path to the load.

Further objects and features of the present invention will be apparent from the following specification and claims when considered in connection with the accompanying drawings illustrating the preferred embodiments of the invention.

DETAILED DESCRIPTION OF THE PREFERRED EMBODIMENT

Figure 1:
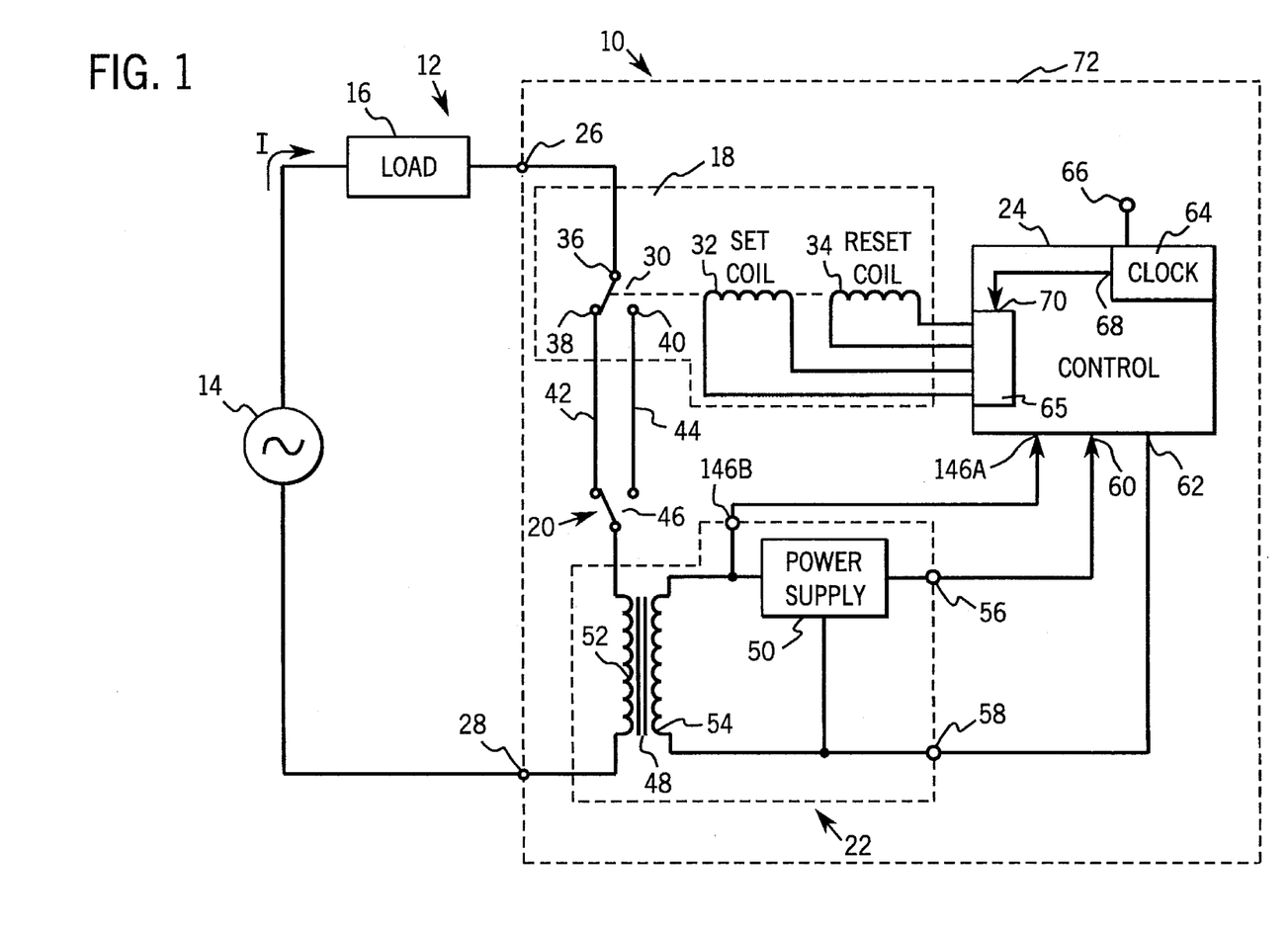
FIG. 1 is a block diagram showing a timer circuit according to a first embodiment of the present invention in conjunction with a two-way circuit to be interrupted.

FIG. 1 is a block diagram showing a timer circuit 10 according to a first embodiment of the present invention in conjunction with a two-way circuit 12 to be interrupted. The circuit 12 includes an AC source 14, a load 16 and the timer circuit 10. The AC source 14 may be any source of time-varying current. The load may be any electrical device or equipment which operates in response to the alternating current supplied by the AC source 14. For example, the load 16 may include a lighting system for providing illumination in a room or outside of a building. Alternatively, the load 16 may include a system for controlling an appliance or other equipment. When a circuit is completed between the AC source 14 and the load 16, an alternating current I flows in the circuit 12 from the AC source 14 to the load 16 and through the timer circuit 10 to operate the load 16. As is understood by those skilled in the art, the current I could be considered to flow from the AC source 14 to the timer circuit 10 and to the load 16. The direction of flow defined for the current I has no effect of the operation of the timer circuit 10.

The timer circuit 10 includes a first switch means 18, a second switch means 20, power supply means 22 and a control circuit 24. The timer circuit 10 also includes a first terminal 26 and a second terminal 28 for coupling the timer circuit 10 between the AC source 14 and the load 16. When the circuit 12 is completed, the current I flows from the AC source 14, through the load 16 to the first terminal 26, through the first switch means 18, through the second switch means 20, and from the second terminal 28 back to the AC source 14. The timer circuit 10 is preferably contained in a housing 72.

The first switch means 18 includes a first switch 30, a set coil 32 and a reset coil 34. The first switch means 18 preferably comprises a single pole, double throw, two coil latching relay. The first switch 30 preferably has a common terminal or pole 36 coupled with the first terminal 26. The first switch 30 also has a first terminal 38 coupled with a first current path 42 and a second terminal 40 coupled with a second current path 44.

The set coil 32 and the reset coil 34 may be energized by providing a control signal such as a current through the respective coil. When one of the coils is energized, for example when the control signal has a first value and the set coil 32 is energized, the first switch 30 couples the common terminal 36 with the first terminal 38. When the other coil is energized, for example when the control signal has a second value and the reset coil 34 is energized, the first switch 30 couples the common terminal 36 with the second terminal 40.

It is a feature of a latching relay, well known in the art, that the latching relay will maintain the state to which it is set or reset even when the set coil and the reset coil are deenergized. Thus, for example, after the set coil 32 is energized to couple the common terminal 36 with the first terminal 38, the first switch 30 will remain in this state even after energy is removed from the set coil. Similarly, for example, after the reset coil 34 has been energized to couple the common terminal 36 with the second terminal 40, the first switch 30 will remain in this state even after energy has been removed from the reset coil.

As will be understood by those having ordinary skill in the art, the first switch means 18 could alternatively comprise a single pole, double throw, single coil latching relay. Such a latching relay includes a latching relay switch, such as first switch 30, and a single relay coil. The latching relay switch is selectively set or reset in response to a control signal, such as a current, applied to the single relay coil. When the control signal has a first value, such as a first polarity, the latching relay switch couples a common terminal, such as common terminal 36, with a first terminal, such as first terminal 38. When the control signal has a second value, such as a second polarity, the latching relay switch couples the common terminal with a second terminal, such as second terminal 40. An alternative embodiment of the present invention employs a single coil latching relay.

The second switch means 20 preferably comprises a manually-actuated switch, and may be, for example, a wall switch of a type typically used to activate a residential lighting circuit. The second switch means 20 preferably comprises a single pole, double throw switch 46.

The power supply means 22 preferably comprises a current transformer 48 and a power supply 50. The current transformer 48 includes a primary winding 52 and a secondary winding 54. When the circuit 12 is completed through the AC source 14, the load 16 and the timer circuit 10, the primary winding 52 conducts the alternating or time-varying current I. This time-varying current in the primary winding 52 induces a time-varying current in the secondary winding 54, the presence of which may be indicated by a detection signal at terminal 146B. The power supply 50 is coupled with the secondary winding 54. In response to the induced time-varying current, the power supply 50 generates a reference signal, such as a constant voltage, at terminals 56, 58.

The control means 24 has a first terminal 60 and a second terminal 62 for receiving the reference signal, and a third terminal 146A for receiving the time-varying current detection signal. The control means 24 also includes a clock 64 and relay drivers 65. In response to the received reference signal, the clock 64 begins timing a time factor. For example, the time factor may be a time duration, such as 10 minutes or 30 minutes. The clock 64 includes a timer adjust circuit 66 for adjusting the time factor. For example, where the time factor is a time duration, the time duration may be varied from two minutes to two hours.

The time factor may alternatively be the time until a predetermined time setpoint, such as 2:10 p.m. Where the time factor comprises a time setpoint, the time factor may be varied to any time of day. For measuring a time factor comprising the time until a predetermined time setpoint, the clock 64 may comprise a battery-powered clock, powered by a secondary energy source such as a battery (not shown in FIG. 1) for maintaining the correct time of day.

When the clock 64 finishes timing the time factor, for example when the predetermined time duration has elapsed, the clock 64 generates a timeout signal at the timer output 68. The relay drivers 65 receive the timeout signal at an input 70. In response to the timeout signal and the time-varying current detection signal, the relay drivers 65 provide a control signal such as a current to energize either the set coil 32 or the reset coil 34 to interrupt the circuit 12.

The operation of the timer circuit 10 will now be described. Initially, when the circuit 12 has been interrupted by the timer circuit 10, no current will flow in the circuit 12 and the second switch 46 will be engaged with the open contact, for example, second terminal 40, of the first switch 30. Manually actuating the second switch 46 to engage the closed contact of the first switch 30, for example first terminal 38, completes the circuit 12 and energizes the load 16.

Completion of the circuit 12 causes time-varying current I to flow in the primary winding 52 of the current transformer 48. The current flow in the primary winding 52 induces a current in the secondary winding 54 and provides a detection signal at terminal 146B. The voltage drop across the primary winding 52 of the current transformer 48 is preferably small, on the order of 0–2 volts AC, allowing the load 16 to see almost the full line voltage produced by the AC source 14. In response to the current induced in the secondary winding 54, the power supply 50 generates a reference signal at the terminals 56, 58. In response to this reference signal, the clock 64 begins timing a time factor.

When the clock 64 has timed the time factor, the clock 64 generates a timeout signal at the output 68 and provides the timeout signal to the relay drivers 65. In response to the timeout signal and the detection signal, the relay drivers 65 energize either the set coil 32 or the reset coil 34, causing the first switch 30 to change state, for example decoupling the common terminal 36 from the first terminal 38 and coupling the common terminal 36 to the second terminal 40. As a result, the circuit 12 is interrupted, the current I ceases to flow, the detection signal at terminal 146B is no longer present, the power supply 50 no longer generates the reference signal and the control means 24 ceases to operate. Therefore, no current will be flowing in the circuit 12, resulting in zero power consumption. Because the first switch means 18 is a latching type relay, the circuit 12 remains interrupted even though no power is applied to the control circuit 24 or to the first switch means 18.

To repeat the cycle and reenergize the load 16 by completing the circuit 12, the second switch 46 is actuated to the opposite position, for example, to engage the second switch 46 with the second terminal 40. As a result, the second switch 46 does not have designated "on" and "off" positions. If it is desired to interrupt the circuit 12 before the clock 64 times out, the second switch 46 can be manually actuated to interrupt the circuit 12.

In order to facilitate understanding of the invention, like elements will be referred to by like reference numerals in the various drawings.

Figure 2:
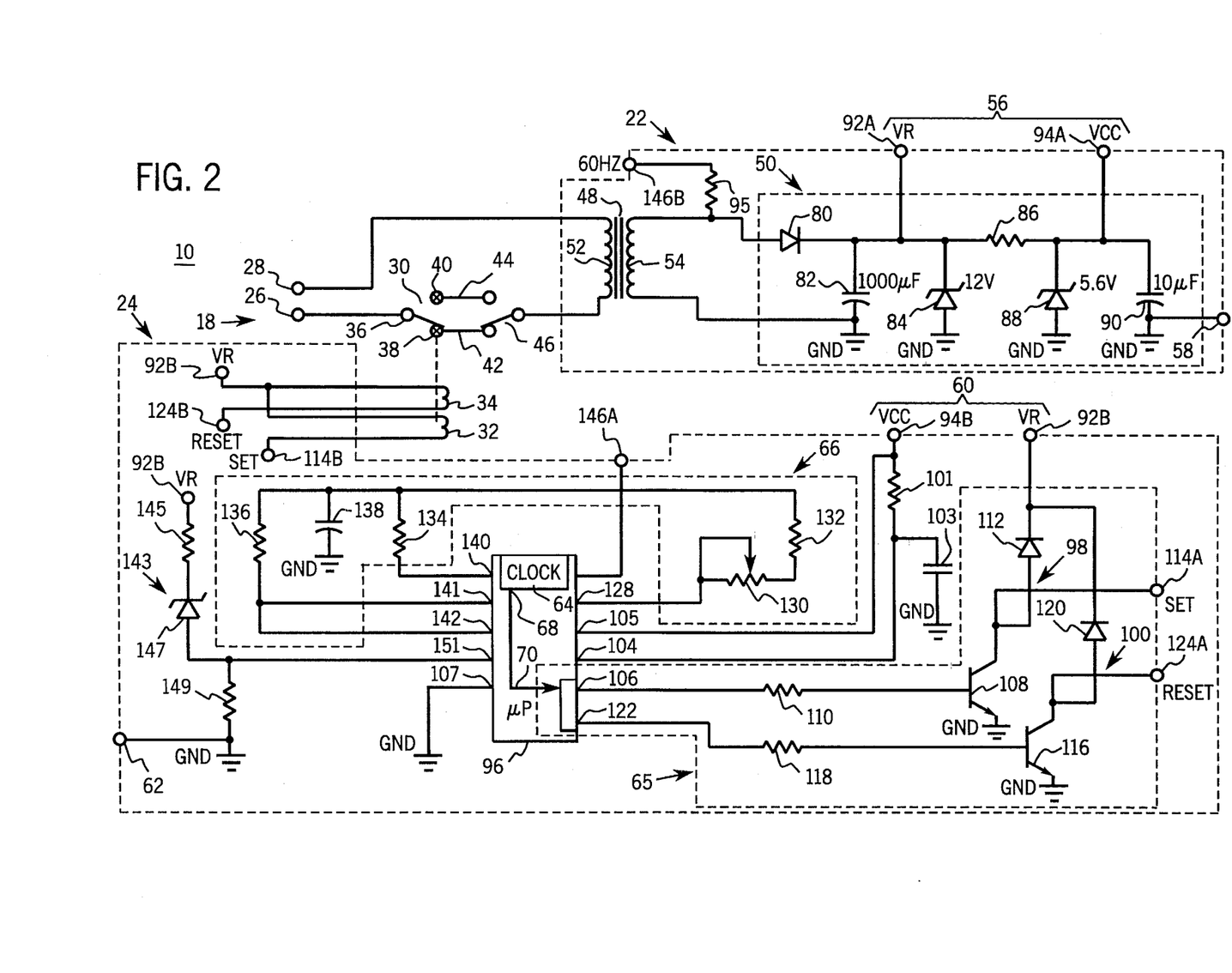
FIG. 2 is a schematic diagram of the timer circuit of FIG. 1.

FIG. 2 is a schematic diagram of the timer circuit 10 of FIG. 1. FIG. 2 illustrates a preferred embodiment of the control means 24 and power supply means 22.

Power supply 22 includes a current transformer 48 and a power supply 50. Power supply 50 includes a diode 80 coupled to the secondary winding 54 of the current transformer 48, and a capacitor 82. The induced time-varying current in the secondary winding 54 of the current transformer 48 is rectified by the diode 80 and charges the first capacitor 82. This voltage is provided at the $V_R$ terminal 92A and is preferably a substantially constant voltage, such as 12 volts. This voltage is maintained by the first zener diode 84. The resistor 86, the capacitor 90 and the second zener diode 88 are coupled to the $V_R$ terminal 92A and cooperate to produce a second substantially constant voltage, preferably 5.6 volts, at the $V_{CC}$ terminal 94A. Power supply means 22 further includes a resistor 95 electrically coupled between secondary winding 54 and a terminal 146B. The flow of the time-varying current in secondary winding 54 may be detected by the presence of a detection signal at terminal 146B.

The control means 24 includes a $V_R$ terminal 92B and a $V_{CC}$ terminal 94B, which are electrically coupled (not shown in FIG. 2) with the terminals 92A and 94A for receiving the first and second substantially constant voltages, respectively, from the power supply means 22. The control means 24 further includes a terminal 146A, which is electrically coupled to terminal 146B (not shown in FIG. 2), for receiving the time-varying current detection signal. The control means 24 and the power supply means 50 are also each coupled to a ground potential, labelled GND in FIG. 2. The control means 24 includes a microprocessor 96, a set output network 98, a reset output network 100 and a timer adjust circuit 66.

The microprocessor 96 may be any processing system capable of providing logic and control functions, and may either be a single chip microprocessor or may be formed from discrete circuit elements. The microprocessor 96 is preferably the PIC16C54 microprocessor, manufactured by Microchip Technologies Corporation. The microprocessor 96 implements the clock 64 and, in combination with the set output network 98 and the reset output network 100, implements the relay drivers 65. The microprocessor 96 includes a clock input 104 coupled to a resistor 101 and a capacitor 103. The resistor 101 is coupled to the $V_{CC}$ terminal 94A of the power supply means 22 and the capacitor is coupled with ground potential. The microprocessor 96 generates an internal clocking signal having a period established by the RC circuit consisting of the resistor 101 and the capacitor 103. The microprocessor 96 has a terminal 105 coupled to the $V_{CC}$ terminal 94A of the power supply means 22 and a terminal 107 coupled to ground potential for powering the microprocessor 96.

The set output network 98 is coupled to a set output 106 of the microprocessor 96. The set output network includes a first NPN transistor 108, a resistor 110 and a diode 112. The first NPN transistor 108 is coupled with a set terminal 114A, which is electrically coupled (not shown in FIG. 2) with the set terminal 114B of the set coil 32 of the first switch means 18. In response to a set control signal provided at the set output 106 of the microprocessor 96, the first NPN transistor 108 turns on to conduct a current from the $V_R$ terminal 92A of the power supply means 22, through the set coil 32, and through the first NPN transistor 108 to ground potential. This current energizes the set coil 32.

The microprocessor 96 preferably asserts the set control signal for a predetermined time, such as 20 msec. When the set control signal is no longer asserted, the first NPN transistor 108 turns off and no longer conducts current from the set coil 32 to ground potential. Because the set coil 32 stores energy, the diode 112 provides a current path for the energy in the set coil 32 to be dissipated, for example, to the $V_R$ terminal 92A of the power supply means 22. The diode 112 thus protects the first NPN transistor 108 from large voltages which may be present at the collector of the first NPN transistor 108 when the microprocessor 96 no longer asserts the set control signal.

The reset output network 100 includes a second NPN transistor 116, a resistor 118 and a diode 120. The reset output network is coupled to a reset output 122 of the microprocessor 96. The second NPN transistor 116 is coupled to a terminal 124A, which is electrically coupled (not shown in FIG. 2) to terminal 124B of the reset coil 34. In response to a reset control signal provided by the microprocessor 96 at the reset output 122, the second NPN transistor 116 turns on to conduct current from the $V_R$ terminal 92 A of the power supply means 22, through the reset coil 34, and through the second NPN transistor 116 to ground potential. This current energizes the reset coil 34.

The microprocessor 96 asserts the reset control signal for a predetermined time, such as 20 msec. When the microprocessor 96 no longer asserts the reset control signal, the second NPN transistor 116 turns off and no longer conducts current from the reset coil 34. Because the reset coil 34 stores energy, the diode 120 provides a current path for the energy in the reset coil 34 to be dissipated, for example, to the $V_R$ terminal 92A of the power supply means 22. The diode 120 thus protects the second NPN transistor 116 from large voltages which may be present at the collector of the second NPN transistor 116 when the microprocessor 96 no longer asserts the reset control signal.

The timer adjust circuit 66 includes a potentiometer 130, a resistor 132, a calibration resistor 134, a capacitor 138 and a resistor 136. The microprocessor 96 calibrates the timer adjust network as follows. The microprocessor 96 initially asserts a low voltage level or logic zero signal at terminal 141, applying a substantially zero potential across the capacitor 138, substantially discharging the capacitor 138. The microprocessor 96 then places terminal 141 in a high impedance state.

The microprocessor 96 then asserts a high voltage level or a logic one signal at the terminal 140. Current supplied at the terminal 140 will charge the capacitor 138 through the calibration resistor 134. The calibration resistor 134 is preferably a precision resistor such as a 210,000 ohm resistor with a 1% tolerance. As the capacitor 138 is charged, the microprocessor 96 monitors the capacitor voltage at the input terminal 142. The microprocessor 96 measures the time required to charge the capacitor 138 to a predetermined voltage to develop a correction factor to calibrate the timer adjust circuit 66. Following calibration, the microprocessor 96 asserts a low voltage level or a logic zero signal at terminal 141 and discharges the capacitor 138.

To measure the time factor established by the potentiometer 130, the microprocessor 96 asserts a high voltage level or a logic one signal at the terminal 128. Resistors 132 and 136 provide current limitation protection. The capacitor 138 is charged by the current through the potentiometer 130 and the resistor 132. The microprocessor 96 measures the time required for the voltage across the capacitor 138 to reach a predetermined voltage, such as the predetermined voltage used in calibrating the timer adjust circuit 66. The microprocessor 96 compares the time required to charge the capacitor 138 through the potentiometer 130 with the time required to charge the capacitor 138 through the calibration resistor 134 to determine a value for the potentiometer 130. In this manner, the time factor measured by the clock 64, such as a time duration or a setpoint, may be varied.

Thus, the timer adjust circuit 66 effectively implements an analog-to-digital converter circuit for converting the analog signal produced by the potentiometer 130 to a digital signal for use by the microprocessor. As will be understood by those having ordinary skill in the art, the timer adjust circuit 66 may be replaced by any components which may be manually adjusted to produce a variable signal, from which the time factor can be calculated. Moreover, the timer adjust circuit 66 could be eliminated so that the clock 64 only times a predetermined time factor.

The control means 24 preferably also includes a reset control circuit 143. Some microprocessors, such as the PIC16C54, include a power on reset circuit which becomes active when the supply voltage is initially applied to the microprocessor and when the supply voltage becomes greater than a predetermined voltage, such as 2 volts. The supply voltage is the potential difference between the most positive operating voltage, such as $V_{CC}$, and the most negative operating voltage, such as ground, applied to the microprocessor. This internal power on reset circuit may not function properly if the supply voltage does not achieve its normal operating range, such as 5 volts, within a predetermined time. In the preferred embodiment of the present invention illustrated in FIG. 2, the capacitors 82, 90 in the power supply 50 may take several seconds to charge to a voltage sufficient to provide an appropriate supply voltage to the terminal 105 of the microprocessor 96.

To prevent the microprocessor 96 from operating improperly during power on reset, the reset control circuit 143 is coupled to a reset input 151 of the microprocessor 96. The reset control circuit 143 includes resistors 145, 149 and zener diode 147. The reset control circuit 143 maintains the reset input 151 at a low voltage or a logic zero level, keeping the microprocessor 96 in a reset condition, until the power supply means 22 is providing a supply voltage at the terminal 92B sufficient to pull the reset input 151 to a high voltage or a logic one level through the reset control circuit 143.

The control means 24 includes a 60 Hz input terminal 146A electrically coupled (not shown in FIG. 2) with a 60 Hz output 146B of the power supply means 22. This signal may be used to accurately measure the passage of time. Furthermore, the control means 24 detects the presence of the induced time-varying current in the secondary winding 54 of the current transformer via terminals 146A, 146B.

In response to the timeout signal from the clock 64, the control means 24 asserts one of the set control signal at output 106 or the reset control signal at output 122, for example, the set control signal. If assertion of this control signal does not cause the first switch means 18 to interrupt the circuit 12, the time-varying current will continue to flow in the primary winding 52 of the current transformer 48, inducing the induced time-varying current in the secondary winding 54. In response to detecting the induced time-varying current at the terminal 146A, the control means 24 will assert the other control signal, for example, the reset control signal, to interrupt the circuit 12.

Figure 3:
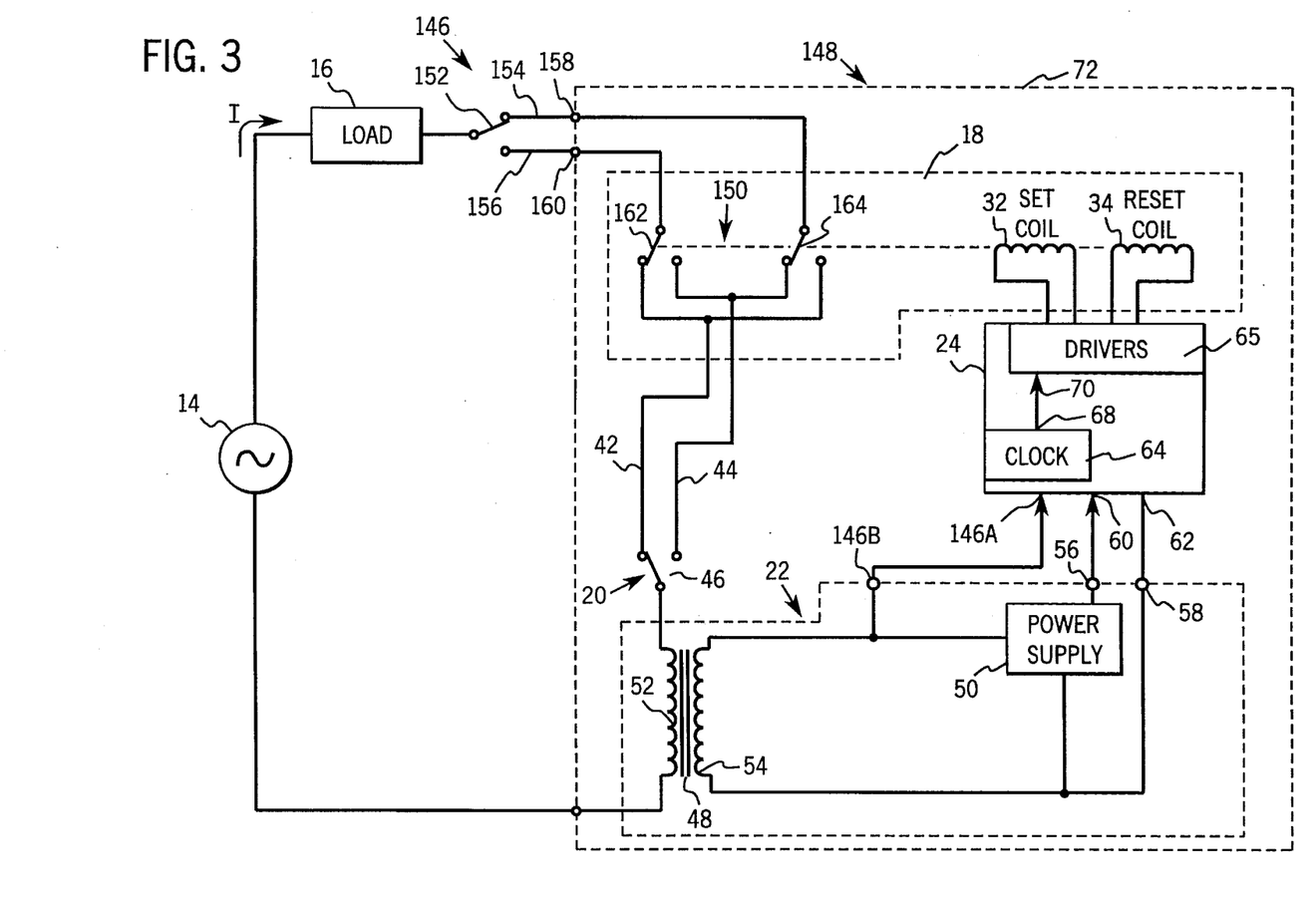
FIG. 3 is a block diagram showing a timer circuit according to a second embodiment of the present invention in conjunction with a three-way circuit to be interrupted.

FIG. 3 is a block diagram showing a timer circuit 148 according to a second embodiment of the present invention in conjunction with a three-way circuit 146 to be interrupted. In FIG. 3, the circuit 146 includes a switch 152 for selectively including one network of a first network 154 and a second network 156 in the circuit 146. The timer circuit 148 includes a first terminal 158 coupled with the first network 154 and a second terminal 160 coupled with the second network 156.

The timer circuit 148 further includes a first switch means 18 including a first switching circuit 150. The first switching means 18 is preferably a double pole, double throw two coil latching relay. The switching circuit 150 includes a first switch 162 for coupling the second terminal 160 with the first current path 42 and a second switch 164 for coupling the first terminal 158 with the second current path 44.

As will be understood by those having ordinary skill in the art, the switch 152 and the switch 46 cooperate to provide three-way operation to complete the three-way circuit 146. Switch 152 and switch 46 may be located some distance apart. One common example of the use of a three-way switch circuit is where one of the switches 46, 152 is located at the top of a flight of stairs and the other switch is located at the bottom of the flight of stairs and the load 16 comprises lighting to illuminate the stairs.

In operation, one of the switches, for example, switch 152, is manually actuated to complete the circuit 146 through the AC source 14, the load 16, the switch 152, the second network 156, the first switch 162, the first current path 42, the switch 46, and the primary winding 52. Completion of the circuit 146 causes the time-varying current I to flow in the circuit 146, operating the power supply means 50 and the control means 24. When the clock 64 times out, either the set coil 32 or the reset coil 34 is energized to cause the first switch 162 and the second switch 164 to switch, interrupting the circuit. Either switch 152 and switch 46 may be actuated to manually interrupt the circuit 146 before the clock 64 times out.

As will be understood by those having ordinary skill in the art, the first switching means 18 could comprise a single pole, double throw latching relay and the switch 46 could be replaced with a double pole, double throw switch to provide three-way operation to complete the three-way circuit 146.

It is to be understood that, while the detailed drawings and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

I claim:
1. An apparatus for interrupting a circuit at a predetermined time, said circuit including a load and a source of time varying current, the apparatus comprising:

relay means including a latching relay switch and relay coil means for actuating said latching relay switch in response to a control signal, said latching relay switch switching to engage a first current path when said control signal has a first value, said latching relay switch switching to engage a second current path when said control signal has a second value;

switch means coupled with said relay means for selectively completing said circuit through one current path of said first current path and said second current path, said circuit conducting said time varying current when said switch means completes said circuit;

power supply means responsive to said time varying current for generating a reference voltage;

timer means coupled with said power supply means for measuring a time factor in response to said reference voltage, said timer means having an output for providing a timeout signal when said timer measures said time factor; and control means coupled with said power supply means and said relay means for providing said control signal, said control means having an input coupled with said timer means output for receiving said timeout signal, said control means responding to said timeout signal by providing said control signal having one value of said first value and said second value, said latching relay switch switching when said control means provides said control signal with said one value to engage the other current path of said first current path and said second current path to interrupt said circuit.

2. An apparatus for interrupting a circuit at a predetermined time as recited in claim 1 wherein said relay coil means comprises a first relay coil and a second relay coil, said relay switch switching to engage a first current path when energy is applied to said first relay coil, said relay switch switching to engage said second current path when energy is applied to said second relay coil, and wherein said control means applies energy to said first relay coil when said control signal has said first value and said control means applies energy to said second relay coil when said control signal has said second value.

3. An apparatus for interrupting a circuit at a predetermined time as recited in claim 1 wherein said power supply means comprises current transformer means for generating an induced time varying current in response to said time varying current, said induced time varying current being interrupted when said circuit is interrupted, said power supply means generating said reference voltage in response to said induced time varying current.

4. An apparatus for interrupting a circuit at a predetermined time as recited in claim 3 wherein said power supply means further comprises rectifying means coupled with said current transformer means for generating a substantially constant voltage in response to said induced time varying current, said substantially constant voltage being interrupted when said induced time varying current is interrupted, said reference voltage comprising said substantially constant voltage.

5. An apparatus for interrupting a circuit at a predetermined time as recited in claim 1 wherein said timer means includes a time set input for receiving a time set signal, said timer means determining said time factor in response to said time set signal, and wherein the apparatus further comprises time set means for generating said time set signal.

6. An apparatus for interrupting a circuit at a predetermined time as recited in claim 5 wherein said time factor comprises a predetermined time duration and wherein said time set means comprises means for determining said predetermined time duration.

7. An apparatus for interrupting a circuit at a predetermined time as recited in claim 5 wherein said time factor comprises a predetermined time set point and wherein said time set means comprises means for determining said predetermined time set point.

8. An apparatus for interrupting a circuit at a predetermined time as recited in claim 1 wherein said switch means comprises a single pole, double throw switch, said single pole, double throw switch being manually actuated to complete said circuit.

9. An apparatus for interrupting a circuit at a predetermined time as recited in claim 1 wherein said circuit further includes three way switch means for selectively including one network of a first network and a second network in said circuit; wherein said latching relay switch selectively couples said first network with said first current path when said control signal has said first value, said latching relay switch selectively coupling said first network with said second current path when said control signal has said second value; and wherein said relay means further includes a second latching relay switch for selectively coupling said second network with said first current path when said control signal has said first value, said second relay switch selectively coupling said second network with said second current path when said control signal has said second value.

10. An apparatus for interrupting a circuit at a predetermined time as recited in claim 9 wherein said relay means comprises a double pole, double throw latching relay.

11. An apparatus for interrupting a circuit at a predetermined time as recited in claim 1 wherein said circuit further includes three-way switch means for selectively including one network of a first network and a second network in said circuit; wherein said switch means includes a first switch coupled with said three-way switch and a second switch coupled with said three-way switch, said first switch selectively coupling said first network with said one current path and said second switch selectively coupling said second network with said one current path.

12. An apparatus for inclusion in a circuit for interrupting said circuit at a predetermined time, said circuit including a load and a source of time varying current; the apparatus comprising:

a first current path segment and a second current path segment;

a first switching means for selectively electrically connecting a first switch pole with one current path segment of said first current path segment and said second current path segment; said one current path segment being an active current path segment, the other current path segment of said first current path segment and said second current path segment being an inactive current path segment; said selectively electrically connecting being effected with said first current path segment in response to a first control signal, said selectively electrically connecting being effected with said second current path segment in response to a second control signal;

a second switching means configured for selectively electrically engaging one of said first current path segment and said second current path segment with a second switch pole; said first switch pole and said second switch pole being coupled within said circuit to complete said circuit when said second switching means electrically engages said active current path segment;

power supply means coupled with said source of time varying current and responsive to said time varying current for generating a reference signal;

timer means coupled with said power supply means and responsive to said reference signal for determining said predetermined time; said timer means generating a timeout signal at a timer output to indicate determination of said predetermined time; and control means coupled with said timer output and with said first switching means for generating a timeout control signal in response to said timeout signal, said timeout control signal being one control signal of said first control signal and said second control signal;

said first switching means electrically connecting said inactive current path segment with said first switch pole in response to said timeout control signal to interrupt said circuit.

13. An apparatus for inclusion in a circuit for interrupting said circuit at a predetermined time as recited in claim 12 wherein said first switching means comprises a first switch, a first coil and a second coil, said first switch being coupled with said first switch pole, said first current path segment and said second current path segment, said first switch selectively coupling said first current path segment with said first switch pole when said first coil is energized, said first switch selectively coupling said second current path segment with said first switch pole when said second coil is energized.

14. An apparatus for inclusion in a circuit for interrupting said circuit at a predetermined time as recited in claim 13 wherein said first relay coil is energized in response to said first control signal and said second coil is energized in response to said second control signal.

15. An apparatus for inclusion in a circuit for interrupting said circuit at a predetermined time as recited in claim 14 wherein said first switching means comprises a latching relay.

16. An apparatus for inclusion in a circuit for interrupting said circuit at a predetermined time as recited in claim 12 wherein said power supply means comprises conversion means for receiving said time varying current and generating a substantially time invariant voltage, said reference signal comprising said substantially time invariant voltage.

17. An apparatus for inclusion in a circuit for interrupting said circuit at a predetermined time as recited in claim 16 wherein said power supply means interrupts said substantially time invariant voltage when said first switching means interrupts said circuit.

18. An apparatus for inclusion in a circuit for interrupting said circuit at a predetermined time as recited in claim 12 wherein said timer means includes a time set input for receiving a time set signal, said timer means determining said predetermined time in response to said time set signal, and wherein the apparatus further includes time set means for generating said time set signal.

19. An apparatus for inclusion in a circuit for interrupting said circuit at a predetermined time, said circuit including a load and a source of time varying current; the apparatus comprising:

a first current path segment and a second current path segment;

a first switching circuit for selectively electrically connecting a first switch pole with one current path segment of said first current path segment and said second current path segment; said one current path segment being an active current path segment, the other current path segment of said first current path segment and said second current path segment being an inactive current path segment; said selectively electrically connecting being effected with said first current path segment in response to a first control signal, said selectively electrically connecting being effected with said second current path segment in response to a second control signal;

a second switching circuit configured for selectively electrically engaging one of said first current path segment and said second current path segment with a second switch pole; said first switch pole and said second switch pole being coupled within said circuit to complete said circuit when said second switching circuit electrically engages said active current path segment;

a power supply coupled with said source of time varying current and responsive to said time varying current for generating a reference signal;

a timer coupled with said power supply and responsive to said reference signal for determining said predetermined time; said timer generating a timeout signal at a timer output to indicate determination of said predetermined time; and a control circuit coupled with said timer output and with said first switching circuit for generating a timeout control signal in response to said timeout signal, said timeout control signal being one control signal of said first control signal and said second control signal;

said first switching circuit electrically connecting said inactive current path segment with said first switch pole in response to said timeout control signal to interrupt said circuit.

20. An apparatus for inclusion in a circuit for interrupting said circuit at a predetermined time as recited in claim 19 wherein said first switching circuit comprises a first switch, a first coil and a second coil, said first switch being coupled with said first switch pole, said first current path segment and said second current path segment, said first switch selectively coupling said first current path segment with said first switch pole when said first coil is energized, said first switch selectively coupling said second current path segment with said first switch pole when said second coil is energized.

21. A control system for interrupting the current in an electric circuit between an electric load and an electric power source in response to an interrupt signal, the system comprising:

a first conductor configured to conduct electric current flow between the load and power source;

a second conductor configured to conduct electric current flow between the load and power source;

a switching circuit coupled to the first and second conductors and the load to couple the first conductor to the load when the second conductor is disconnected from the load in response to a first change of an interrupt signal, and to couple the second conductor to the load when the first conductor is disconnected from the load in response to a second change of the interrupt signal; and a control circuit coupled to the switching circuit to apply the interrupt signal to the switching circuit, the control circuit generating changes of the interrupt signal in response to an event signal.

22. The system of claim 21, wherein the control circuit comprises a timing circuit, which generates the event signal at a predetermined time.

23. The system of claim 21, further comprising a manual switching circuit coupled to the first and second conductors and the load to couple the first conductor to the load when the second conductor is disconnected from the load, and to couple the second conductor to the load when the first conductor is disconnected from the load.

24. The system of claim 22, wherein the control circuit further comprises a detection circuit, the detection circuit applying a detection signal to the timing circuit indicative of a presence of a current flow through the load, the timing circuit generating a first change of the event signal at a predetermined time and a second change of the event signal in response to continued application of the detection signal.

25. The system of claim 24, wherein the predetermined time is a measure of an amount of time elapsing after application of the detection signal to the timing circuit.

* * * * *